United States Patent [19]

Schulze

[11] 4,300,977
[45] Nov. 17, 1981

[54] MACHINE FOR WELDING THERMOPLASTIC SHEETS

[75] Inventor: Ehrhart Schulze, Fellbach, Fed. Rep. of Germany

[73] Assignee: Karl Heinz Stiegler, Stuttgart, Fed. Rep. of Germany

[21] Appl. No.: 82,054

[22] Filed: Oct. 5, 1979

[30] Foreign Application Priority Data

Oct. 24, 1978 [DE] Fed. Rep. of Germany ....... 2846219
Oct. 24, 1978 [DE] Fed. Rep. of Germany ....... 2846220

[51] Int. Cl.³ .............................................. B32B 31/00
[52] U.S. Cl. ..................... 156/515; 83/116; 156/582
[58] Field of Search .................. 156/515, 251, 582; 83/116, 117; 226/97, 544

[56] References Cited

U.S. PATENT DOCUMENTS 3,552,244  4/1969  Smith ..................................... 83/116
3,755,041  8/1973  Membriwo ...................... 156/582 X
3,793,927  2/1974  Emond ............................ 156/515 X
3,947,198  3/1976  Hutt ................................ 156/515 X
3,976,237  8/1976  Bossoms ............................. 226/97

Primary Examiner—David A. Simmons
Attorney, Agent, or Firm—Thomas R. Morrison

[57] ABSTRACT

A conveyor surface for carrying off separated sheets in a web welding and separating machine is displaced from a welding gap between a welding roller having a welding tool and an opposing roller in the direction of the axis of the opposing roller. As the leading edge of a thin web passes beyond the welding gap, it tends to stay close to the surface of the opposing roller until it has been borne a substantial circumferential distance past the welding gap, whereupon it separates therefrom. A guide plate bridges a space between the opposing roller and the conveyor surface to smoothly transfer the separated sheets to the conveyor surface. An elastically compressible strip on the welding roller is optionally used to improve the separation of the leading edge of the web from the welding tool and to closely press it against the opposing roller.

13 Claims, 2 Drawing Figures

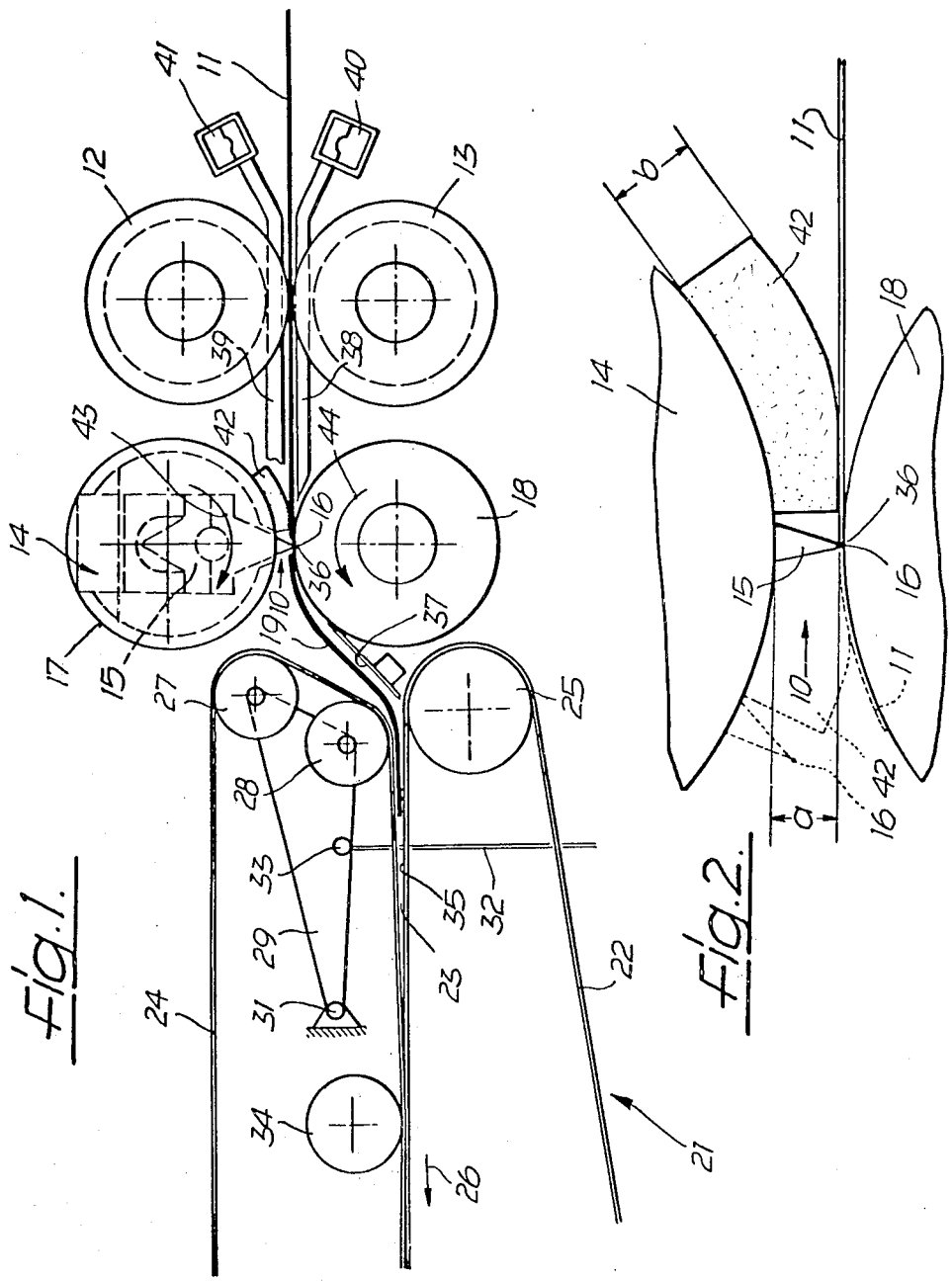

1

MACHINE FOR WELDING THERMOPLASTIC SHEETS

BACKGROUND OF THE INVENTION

The present invention relates to an apparatus for welding a web of thermoplastic material using a welding tool which, utilizing the surface of an opposing roller as abutment for the welding tool, forms a welding gap through which the web to be welded is moved toward a conveyor while laying loosely on the opposing roller.

Machines of this type are known from U.S. Pat. No. 2,185,647 and West German Provisional Patent 1,296,356, as well as West German Pat. No. 1,215,350. These known machines serve in particular to produce bags from a continuous two-ply thermoplastic web by simultaneously welding seams and separating individual bags from each other.

These known welding machines, however, have the disadvantage that, when thin webs are welded, the leading edge of the web moving away from the welding gap is disturbed and does not always reach the conveyor for removing the finished bags. To reduce the unsupported distance through which the leading edge of the web must travel past the welding gap the feed rollers which lead the separated sections of web away have been made with the smallest possible diameter so that they can be arranged as close as possible to the welding gap. This solution has the disadvantage that, with the decrease in diameter of these rollers, their flexural strength decreases. When long rollers are used they tend to sag. Experience has shown that, even using take-up rollers of the smallest possible diameter, extremely thin bags still cannot be produced.

In order to remedy this situation, West German Unexamined Application for Patent 24 02 545 proposes providing an abutment for the welding tool which is resiliently supported in an opposing roller and which protrudes by a small amount beyond the outer circumference of the opposing roller. This known opposing roller has chambers therein which are connected by openings with the outer circumference of the opposing roller and within which an elevated pressure or a vacuum can be alternatively produced. In this way, the oncoming web may be drawn against the drum by suction and be repelled from the opposing roller by pressure therein. In these known machines, the web does not lie loosely against the opposing roller but is drawn against the same and is therefore connected with it during the transportation along the surface of the opposing roller.

OBJECTS AND SUMMARY OF THE INVENTION

Accordingly, it is an object of the present invention to provide a machine for welding and separating a web of thermoplastic material which overcomes the disadvantages of the prior art.

It is a further object of the present invention to provide a web welding and separating apparatus which is capable of welding and separating extremely thin webs of thermoplastic film.

It is a further object of the present invention to rapidly produce extremely thin sheet sections, particularly bags, from extremely thin webs of thermoplastic film using a machine in which the web rests loosely on an opposing roller.

It has surprisingly been found that these objectives can be achieved in accordance with the present invention by displacing the conveying surface of a conveyor device which removes the separated sheets after welding away from alignment with the welding gap somewhat in a direction toward the axis of the opposing roller. This forms an angular space between the surface of the opposing roller and the conveying surface. A guide plate substantially tangentially adjoins the circumferential surface of the opposing roller and bridges the space between the opposing roller and the conveying surface. In experiments which were carried out with a welding machine developed in this manner, it was surprisingly found that the leading edge of even extremely thin webs remained closely adjacent the surface of the opposing roller for a substantial distance beyond the welding gap and became detached slightly from the surface of the opposing roller only after being carried a substantial circumferential distance past the welding gap. The guide surface was positioned to smoothly guide the leading edge as it lifted off the surface of the opposing roller and to direct it to the conveying surface. Although the present invention should not be limited by theory, this surprising effect may be due to the fact that the relatively high speed of rotation of the opposing roller produces a stream of air in the welding gap which diverges upon leaving the welding gap and thereby presses the leading edge of the web against the opposing roller. At a substantial circumferential distance past the welding gap, the stream of air may no longer hold the web firmly against the opposing roller and thus may permit the release of the leading edge of the web from the opposing roller.

At high production speeds in machines with continuously rotating welding tools, the leading edge of the web may be slightly lifted by the welding tool after welding and thus be moved away from the opposing roller. In order to avoid this it is advantageous to provide at least one elastically compressible strip behind the welding tool as seen in its direction of rotation which protrudes radially beyond the welding edge of the welding tool. The elastically compressible strip is compressed by the opposing roller during welding and expands to its normal thickness immediately after welding when the welding edge lifts from the opposing roller. The compressible strip thus moves the leading edge of the web off the welding tool and presses it tightly against the opposing roller. This increases the tendency of the leading edge of the web to follow the circumference of the opposing roller.

Accordingly, apparatus is provided for separation welding of a thermoplastic web comprising welding means for separation welding of the thermoplastic web to produce separated sheets each having a leading edge, the welding means including a welding gap defined by at least a welding tool and a rotatable opposing roller, the opposing roller having a circumferential surface and an axis, means for conveying the separated sheets from the welding means, the means for conveying including a conveyor surface, the conveyor surface defining a plane which intersects the opposing roller at a distance displaced from the welding gap toward the axis, and guide means for guiding the leading edge from the opposing roller to the means for conveying.

The above, and other objects, features and advantages of the present invention will become apparent from the following description read in conjunction with the accompanying drawings in which like reference numerals designate the same elements.

BRIEF DESCRIPTION OF THE DRAWINGS

The invention will be explained in detail in the following description of an illustrative embodiment shown in the drawings, in which:

FIG. 1 is a schematic simplified side view of a welding apparatus including a welding gap and adjacent conveying devices for feeding a web to the welding gap and for transporting separated sheets away from it; and FIG. 2 is an enlarged view of a portion of FIG. 1.

DETAILED DESCRIPTION OF THE PREFERRED EMBODIMENT

Referring to the figures, a longitudinally slit tubular thermoplastic web 11 is fed by feed rollers 12 and 13 to a welding gap 10 between a welding roller 14 and an opposing roller 18. Welding roller 14 includes a cylindrical surface 17 and a heated welding tool 15 having a welding edge 16. Welding edge 16 protrudes an amount a beyond cylindrical surface 17 of welding roller 14. Welding edge 16 cooperates with opposing roller 18 such that, when web 11 is in welding gap 10, welding edge 16 presses against web 11, which is backed up by opposing roller 18. Thus at least welding, and preferably separation welding is performed on web 11 to produce a bag 19 separated from web 11 in which a side seam is formed on the trailing edge of bag 19 while a seam is simultaneously formed on the leading edge of web 11 which forms the leading side seam of the next bag.

The construction of welding roller 14, which is not essential for the present invention, has been described in detail in West German Provisional Patent 28 35 671, the disclosure of which is herein incorporated by reference. Welding roller 14 and opposing roller 18 are driven with non-uniform speed via an advancing mechanism in the manner described in detail in the U.S. Patent application Ser. No. 014,317 filed Feb. 23, 1979, the disclosure of which is herein incorporated by reference.

Downstream of welding gap 10, a conveyor, designated generally as 21, feeds bag 19 which has been separated from web 11 in welding gap 10 to a conventional stacking device (not shown). Conveyor 21 has a plurality of lower conveyor belts 22 arranged side by side (only one of which is shown) and a plurality of upper conveyor belts 24 arranged side by side whose lower courses oppose upper courses of lower conveyor belts 22. Lower conveyor belts 22 are guided around a front guide roller 25 which is supported in fixed but rotatable fashion in the machine. Lower conveyor belts 22 are guided at their other ends around similar guide rollers (not shown in the drawing) at least one of which is driven to drive the upper courses of lower conveyor belts 22 continuously in the direction of conveyance shown by an arrow 26 at a speed which is somewhat greater than the speed of conveyance of feed rollers 12 and 13.

Upper conveyor belts 24 travel around two front guide rollers 27 and 28 which are rotatably mounted on a triangular lever 29. Triangular lever 29, in turn, is pivotably mounted on a horizontal shaft 31 which is fixed to the frame of the machine and is moved up and down via a bar 32 by a drive (not shown in the drawing). Bar 32 is pivoted at triangular lever 29 at a pivot 33. Downstream of lower front guide roller 28 in the direction of conveyance 26, a roller 34 is rotatably fixed in position and presses the lower courses of upper conveyor belts 24 against the upper courses of lower conveyor belts 22. Upward and downward movement of triangular lever 29 moves the parts of the lower courses of upper conveyor belts 24 which are located upstream of roller 34 up and down so as to form a continuously opening and closing inlet conveyor slot 23. This upward and downward movement of triangular lever 29 is synchronized with the circumferential movement of welding tool 15 such that, when welding is concluded by welding tool 15, conveyor slot 23 closes and the separated bag 19, whose leading edge has entered the opened conveyor slot 23, is grasped by conveyor 21 and moved in the direction of conveyance 26.

Front guide roller 25 positions a conveyor surface 35, formed by the upper courses of lower conveyor belts 22, displaced downward by an amount approximately equal to the radius of opposing roller 18 from a point 36 on opposing roller 18 which defines the lower extremity of welding gap 10. The sharp-angled angular space formed between opposing roller 18 and conveyor surface 35 is bridged by a guide surface formed by a guide plate 37. Guide plate 37 joins the circumferential surface of opposing roller 18 substantially tangentially.

Guide rakes 38 and 39 help guide web 11 into welding gap 10. The interior of guide rakes 38 and 39 are hollow and are connected to blast air pipes 40 and 41 respectively through which a stream of air is directed into welding gap 10 to help feed web 11 into welding gap 10. Electrostatic charges on web 11 are preferably discharged by making feed roller 12 of an electrically conductive material, such as, for instance, of steel, and by grounding feed roller 12.

An elastically compressible strip 42 which extends parallel to the welding tool 15 is fastened adjacent to welding tool 15. Elastically compressible strip 42 protrudes an amount b beyond cylindrical surface 17 of welding roller 14 when uncompressed. Distance b is greater than distance a by which welding edge 16 of welding tool 15 protrudes beyond cylindrical surface 17 of welding roller 14. Thus, elastically compressible strip 42 protrudes radially beyond welding edge 16. Elastically compressible strip 42 may be made of any suitable elastically compressible material, such as, for example, foam rubber, sponge rubber or other foam material, but is preferably a foamed elastic synthetic material.

Welding roller 14 and opposing roller 18 rotate in the direction indicated by arrows 43 and 44 respectively at a non-uniform speed. The speed of welding roller 14 and opposing roller 18 is controlled to match the constant speed of conveyance of web 11 as welding edge 16 presses web 11 against opposing roller 18. Welding tool 15 is heated by any suitable means such as, for example, by an electric heating element, not shown, to a temperature required for performing separation welding of web 11. Welding edge 16, and elastically compressible strip 42 directly behind it, contact web 11 at approximately the same time. Elastically compressible strip 42 is compressed in welding gap 10 between the two rollers. When welding edge 16 moves away from web 11 upon further rotation after welding is completed, the leading edge of web 11 remains pressed against opposing roller 18 while elastically compressible strip 42 passes through welding gap 10 and is fed along the surface of opposing roller 18 and the surface of guide plate 37 to conveyor 21.

Even if no blast air is fed to welding gap 10 by blast air pipes 40 and 41, a stream of air is produced through welding gap 10 in the direction of conveyance by the rotation of rollers 14 and 18. The stream of air diverges as it continues past welding gap 10 and thereby continues to press the leading edge of web 11 against the surface of opposing roller 18. This pressure holding the leading edge against opposing roller 18 decreases with increasing distance from welding gap 10 so that the leading edge of web 11 slides readily onto the surface of guide plate 37 and is guided by the latter into the opened conveyor slot 23 of conveyor 21. As soon as bag 19 is separated from web 11 by welding tool 15, conveyor slot 23 of conveyor 21 closes and conveys bag 19 at higher speed to a stacking device (not shown).

Welding roller 14 and opposing roller 18 are driven synchronously during operation with a non-uniform circumferential speed such that, during contact of welding edge 16 with opposing roller 18, the speeds of welding edge 16, opposing roller 18 and web 11, are equal. Shortly after welding, the circumferential speed of welding roller 14 is increased so that the welding edge 16 is moved away from the leading edge of web 11. The width of elastically compressible strip 42 is dimensioned so that, during its contact with opposing roller 18 the circumferential speeds of welding edge 16 and opposing roller 18 are still substantially equal to the constant speed of advance of web 11.

In the preferred embodiment described in the preceding, welding tool 15 is shown mounted on rotating welding roller 14. However, welding roller 14 need not be used. Instead, welding tool 15 may be mounted on a bar (not shown) which is rotatably supported at its distal end for rotating welding tool 15 into abutment with opposing roller 18. Alternatively, welding tool 15 and elastically compressible strip 42 may be affixed to one edge of a blade-shaped frame (not shown) which is supported for rotation at its opposite edge.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for separation and welding of a thermoplastic web comprising:
    separation and welding means for separation and welding of said thermoplastic web to produce separated sheets, each having a leading edge, said separated sheets being followed by a leading edge of said web;
    said welding means including at least a welding tool and a rotatable opposing roller;
    said opposing roller having a closed cylindrical circumferential surface and an axis;
    said welding tool and said circumferential surface defining a welding gap;
    first means for conveying said thermoplastic web to said welding gap in a direction of conveyance;
    second means for conveying said separated sheets from said welding means;
    said second means for conveying including a conveying support;
    said conveying support defining a surface which intersects said opposing roller at a distance displaced from said welding gap toward said axis;
    a guide plate disposed substantially tangentially adjacent to said circumferential surface for guiding said leading edge of said web to said second means for conveying;
    means for producing a high-speed flow of air through said welding gap, said flow of air being effective to hold said leading edge closely adjacent said circumferential surface of the opposing roller for a first distance and to permit said leading edge to separate from said circumferential surface at a second distance; and
    said guide plate being disposed beyond said second distance whereby said leading edge slides over said guide plate and is guided thereby to said second means for conveying.

2. The apparatus according to claim 1; wherein said means for separation and welding further includes means for pushing said leading edge of said web away from said welding tool.

3. The apparatus according to claim 1; wherein said first means for conveying includes means for directing blast air through said welding gap on both sides of said web in said direction of conveyance.

4. The apparatus according to claim 2; wherein said means for pushing away includes an elastically compressible strip disposed adjacent to said welding tool and upstream thereof, said elastically compressible strip being effective for pressing a portion of said web following said separation and welding tool against said opposing roller and for holding it thereagainst for a substantial travel of said leading edge past said welding gap.

5. A machine for separation and welding of sheets from a thermoplastic web comprising:
    a rotatable separation and welding means;
    an opposing roller having a cylindrical circumferential surface and an axis operative to oppose said separation and welding means;
    means for passing said thermoplastic web between said separation and welding means and said opposing roller;
    means for periodically contacting said separation and welding means to said web against said opposing roller and for welding and separating a leading portion of said web from the remainder thereof;
    means for conveying said leading portion away from said separation and welding means;
    said means for conveying including a conveying support;
    said conveying support defining a surface which intersects a surface of said opposing roller at a distance displaced from said welding gap in a direction toward said axis of said opposing roller;
    a guide plate tangentially adjoining said surface of said opposing roller for guiding said leading portion from said opposing roller to said conveyor surface;
    means for producing a high-speed flow of air through said welding gap, said flow of air being effective to hold said leading edge closely adjacent said circumferential surface of the opposing roller for a first distance and to permit said leading edge to separate from said circumferential surface at a second distance; and said guide plate being disposed beyond said second distance whereby said leading edge slides over said guide plate and is guided thereby to said conveying support.

6. A machine according to claim 5; wherein said distance is substantially equal to a radius of said opposing roller.

7. A machine according to claim 5; wherein said rotatable welding means is continuously rotating.

8. A machine according to claim 5; wherein said separation and welding means includes a welding roller having a surface, and a welding tool supported on said welding roller, a welding edge on said welding tool protruding a first predetermined distance beyond said surface of said welding roller, and an elastically compressible strip supported on said welding roller adjacent said welding tool and upstream thereof, said elastically compressible strip protruding a second predetermined distance beyond said surface, and said second predetermined distance being greater than said first predetermined distance.

9. A machine according to claim 5; further comprising said conveying support being a surface of an upper course of at least one conveyor belt.

10. A machine for welding seams in a thermoplastic web having at least two plies comprising:
a separation and welding tool continuously rotating about an axis;
a welding edge on said welding tool;
an opposing roller having a cylindrical circumferential surface opposing said welding tool and defining a welding gap therebetween, said welding tool being effective to weld and separate said web into sheets each of which sheets includes a leading edge;
first conveying means for feeding said thermoplastic web to said welding gap;
second conveying means including means for removing said sheets from said welding gap;
an elastically compressible strip rotating with said welding tool and located in a lagging direction relative to the rotation of said welding tool;
means for producing a high-speed flow of air through said welding gap;
said elastically compressible strip protruding radially from said axis a greater distance than said welding edge, said elastically compressible strip and said high-speed flow of air being effective to hold said leading edge against said opposing roller for a first distance past said welding gap and to permit said leading edge to separate from said opposing roller at a second distance; and
a guide plate tangentially disposed adjacent said opposing roller at a tangential position beyond said second distance where said leading edge of said web lifts off said opposing roller and effective to guide said leading edge to said second conveying means.

11. A machine according to claim 10; wherein said elastically compressible strip extends parallel to and directly adjacent said welding tool over the entire length thereof.

12. A machine according to claim 10, wherein said elastically compressible strip is foam material.

13. A machine according to claim 10, wherein said opposing roller and said welding tool are driven with non-uniform circumferential speed, the circumferential speeds of the welding edge and opposing roller being equal to the speed of advance of said thermoplastic web during welding, said elastically compressible strip having a width dimensioned such that the above equality in speed is substantially maintained during contact between said elastically compressible strip and said thermoplastic web.

* * * * *